United States Patent
Mishra et al.

(10) Patent No.: US 12,423,440 B2
(45) Date of Patent: Sep. 23, 2025

(54) INTEGRATED SECURITY WORKBENCH

(71) Applicant: ADP, INC., Roseland, NJ (US)

(72) Inventors: Prateek Mishra, Roseland, NJ (US); Jonathan S. Wright, Roseland, NJ (US); Peter Faria, Marlborough, MA (US); Carl C. Pereira, Marlborough, MA (US); Kenneth D. Atkins, Jeffersonville, IN (US); Gaurav Bhargava, Roseland, NJ (US); Seena A. Iype, Louisville, KY (US)

(73) Assignee: ADP, Inc., Roseland, NJ (US)

( * ) Notice: Subject to any disclaimer, the term of this patent is extended or adjusted under 35 U.S.C. 154(b) by 232 days.

(21) Appl. No.: 18/204,257

(22) Filed: May 31, 2023

(65) Prior Publication Data

US 2024/0403436 A1   Dec. 5, 2024

(51) Int. Cl.
*G06F 21/57* (2013.01)
*G06F 8/10* (2018.01)

(52) U.S. Cl.
CPC .............. *G06F 21/577* (2013.01); *G06F 8/10* (2013.01); *G06F 2221/033* (2013.01)

(58) Field of Classification Search
CPC .............. G06F 11/362; G06F 11/3604; G06F 11/3668; G06F 11/3672; G06F 11/3688; G06F 11/3692; G06F 11/3698; G06F 21/577; G06F 2221/033
See application file for complete search history.

(56) References Cited

U.S. PATENT DOCUMENTS

| | | | |
|---|---|---|---|
| 5,513,315 A * | 4/1996 | Tierney ............... | G06F 11/3688 714/10 |
| 2008/0092237 A1* | 4/2008 | Yoon ..................... | G06F 21/577 726/25 |
| 2015/0019564 A1* | 1/2015 | Higginson .......... | G06F 11/3414 707/748 |
| 2019/0318098 A1* | 10/2019 | Clift ..................... | G06F 11/3604 |
| 2020/0097662 A1* | 3/2020 | Hufsmith .............. | H04L 9/0643 |

* cited by examiner

*Primary Examiner* — Kevin Bechtel
(74) *Attorney, Agent, or Firm* — Foley & Lardner LLP

(57) ABSTRACT

The present disclosure relates generally to a security workbench and, more particularly, to a system, method and computer program product which integrates different scanner types into a single, integrated security tool. The method, for example, includes: integrating, by a computer system, a plurality of scanner types into a single tool; and displaying, by the computer system, an output of any of the plurality of scanner types run on software code in a standardized format in a graphical user interface of the tool.

20 Claims, 13 Drawing Sheets

FIG. 4

Security Summary

Product Name

☐ Filter by repository name — 505

Summarized Severity  ☐ Critical ☐ High ☐ Medium ☐ Low — 515, 520

| | | Code | Secrets | Library |
|---|---|---|---|---|
| ☐ Repository name 1 | Master<br>Developer | | | No scan<br>0 |
| ☐ Repository name 2 | Master<br>Developer | 0<br>0 | 0<br>0 | 30<br>0 |
| ☐ Repository name 3 | Master<br>Developer | 0<br>0 | 0<br>0 | 218<br>0 |
| ☐ Repository name 4 | Master<br>Developer | 0<br>1 | 0<br>1 | 0<br>1 |
| ☐ Repository name 5 | Master<br>Developer | 0<br>0 | 0<br>0 | 25<br>0 |
| ☐ Repository name 4 | Master<br>Developer | 5<br>5 | 5<br>5 | 0<br>5 |

INTEGRATED SECURITY WORKBENCH

TECHNICAL FIELD

The present disclosure relates generally to a security workbench and, more particularly, to a system, method and computer program product which integrates different scanner types into a single, integrated security tool.

BACKGROUND

Software development is a complicated and time consuming task. Typically, many autonomous development groups are used to develop a single software application, i.e., product. These different development groups may develop different portions of the software application, each of which may have different vulnerability requirements. For example, some development groups may focus on database development; whereas other development groups may focus on API development, etc.

The different development groups may work with many different tool sets, e.g., scanner types, depending on their own security concerns. For this and other reasons, there are many different approaches to detecting and closing security vulnerabilities for a single application over different development teams.

The use of different tools, though, leads to many technical problems. For example, it becomes expensive to maintain separate departmental infrastructures for different development teams because it requires more networking and processing resources as well as monetary resources. It is also difficult to enforce a uniform level of security compliance with enterprise guidelines when using different infrastructures and different scanner types, as there is no simple way of reviewing security vulnerability issues across different scanner types.

SUMMARY

In a first aspect of the present disclosure, a method includes: integrating, by a computer system, a plurality of scanner types into a single tool; and displaying, by the computer system, an output of any of the plurality of scanner types run on software code in a standardized format in a graphical user interface of the tool.

In another aspect of the present disclosure, a computer program product includes one or more computer readable storage media having program instructions collectively stored on the one or more computer readable storage media. The program instructions are executable to: integrate a plurality of scanner types into a single tool using a layered integration architecture; run one or more scans on software code using any of the plurality of scanner types to determine security vulnerability issues; and generate a display of the security vulnerability issues in a standardized format in a graphical user interface regardless of which scanner type is run.

In a further aspect of the present disclosure, a processor, a computer readable memory, one or more computer readable storage media, and program instructions collectively stored on the one or more computer readable storage media are provided. The program instructions are executable to: generate a display of security vulnerability issues of different sections software code ascertain by any of a plurality of scanner types, the security vulnerability issues being in a standardized format in a graphical user interface regardless of which scanner type is run on the different sections software code.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 4 shows a graphical user interface for displaying different products in accordance with aspects of the present disclosure.

FIG. 5 shows a graphical user interface for displaying a security summary for one or more repositories for a product in accordance with aspects of the present disclosure.

FIG. 12 shows a graphical user interface for displaying the security issues of FIG. 11 for a particular scanner type, in accordance with aspects of the present disclosure.

Figure 13:
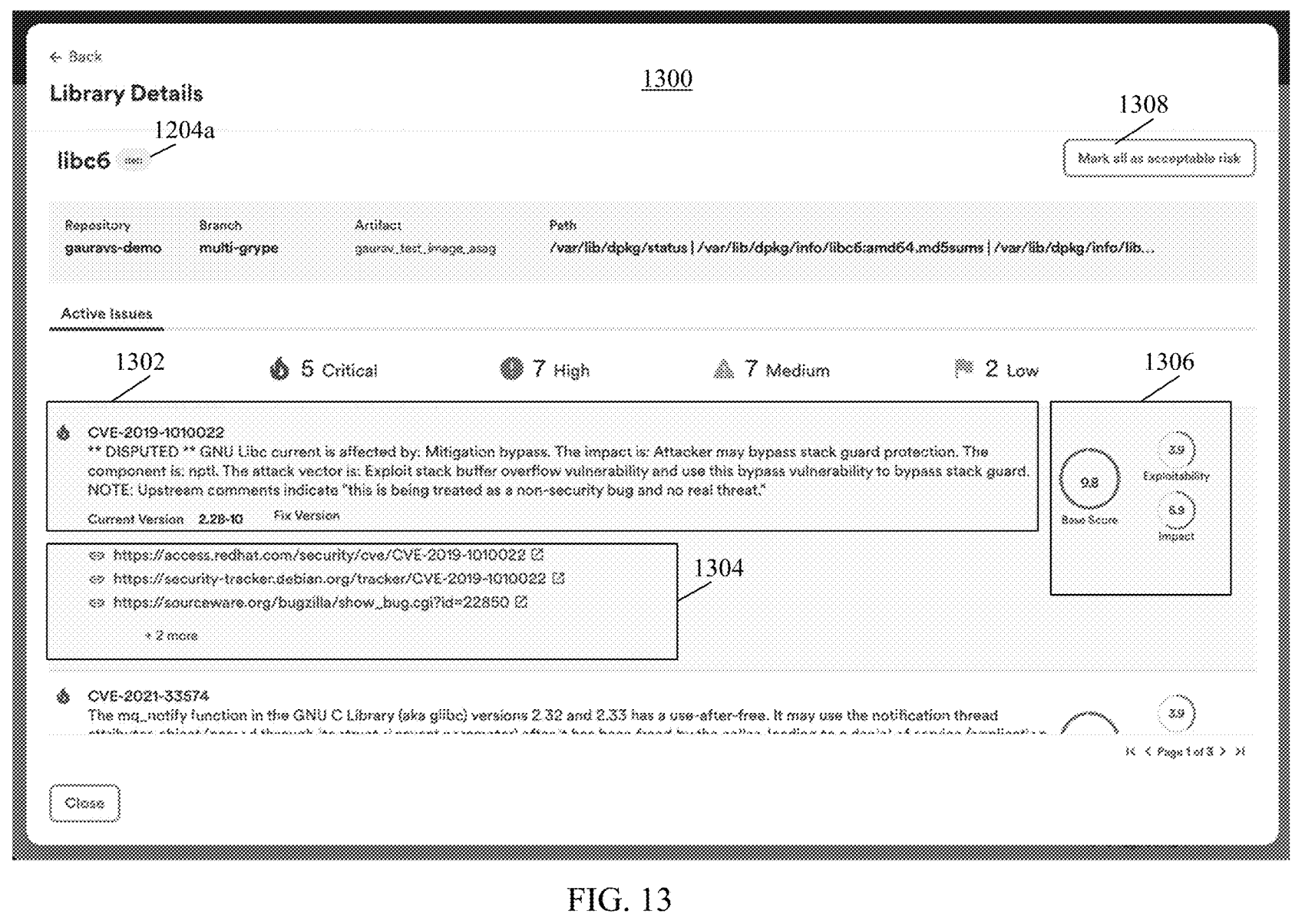

FIG. 13 shows a graphical user interface for displaying details of a particular security issue of FIG. 12, in accordance with aspects of the present disclosure.

DETAILED DESCRIPTION OF ASPECTS OF THE INVENTION

Figure 1:
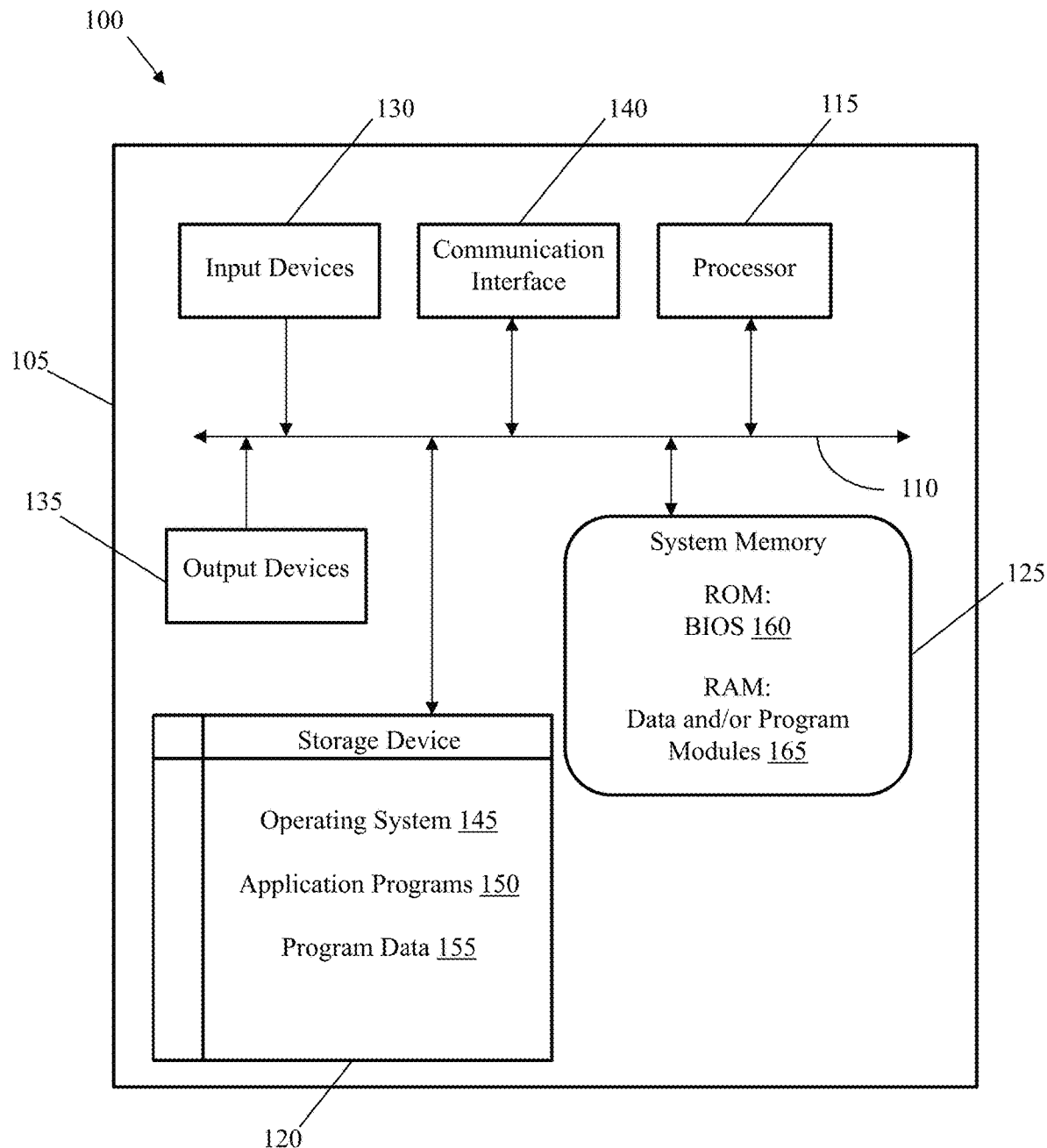
FIG. 1 is an illustrative architecture of a computing system implemented in embodiments of the present disclosure.

The present disclosure relates generally to a security workbench and, more particularly, to a system, method and computer program product which integrates different scanner types into a single, integrated security tool. In more specific embodiments, the integrated security tool provides the user with the ability to run different scanner types on software code regardless of product type (e.g., software application) and, advantageously, generates an overall, standardized view of all security vulnerability issues regardless of scanner type. In this way, the integrated security tool provides a developer or other user with an overall view of security vulnerability issues in any easy to understand and uniform (standardized) format using a wide range of scanner types used on different sections (e.g., branches) of code. The integrated security tool also allows an administrator, team lead, etc., to view multiple security postures and progress of solving security issues over multiple different products. By standardizing the security vulnerability issues, the systems and methods described herein increase compliance with a variety of security measures thus providing a technical solution to the technical problem of ensuring compliance across various scanner types and product types.

Accordingly, the integrated security tool provides a technical feature to a technical problem related to identifying security vulnerabilities of software code throughout the same or different products using different scanner types. These scanner types can be, for example, open Source, existing enterprise licenses for on-premise and SaaS models. In some embodiments, these scanner types can be static scanners known as static application security testing (SAST) tools. There are a large variety of SAST tools which are each tailored for evaluating different scenarios. For example, a first SAST tool may be used to evaluate a mobile application product written in a first software code language while a second SAST tool may be used to evaluate a web application product written in a second software code language. And by integrating the different scanner types into an integrated security tool, it is now possible to summarize the output of the multiple scanner types in a uniform, standardized format so that a user can easily access their entire security status over a variety of different products and applications. The integrated security tool decreases the amount of computer networking resources and processing power resources necessary to access their entire security status by combining all the scanner types into a single security workbench. Also, by integrating any "n" number of scanner types into the integrated security tool, it is now possible to identify security vulnerability issues from various input sources and provide a uniform view and understanding of the security posture of multiple software applications (e.g., products) for multiple different teams working on different aspects of the product, e.g., different branches or files of the product. The integrated security tool also compares a security posture of various products across departments using different scanner types, and allows for enforcement of a uniform level of compliance with enterprise guidelines which provides better computer network security.

Thus, the integrated security tool is configured to and is capable of providing, amongst other features and advantages described herein, the following functionality on a computing infrastructure, system, or computer program product (e.g., software product):

(i) ensuring that developers and development teams are tasked only with security vulnerabilities relevant to them to provide a more efficient workflow;
(ii) providing information sharing between development teams including providing actionability of remediation guidance;
(iii) providing process efficiencies between development teams and CSO (Security SMEs);
(iv) providing shared infrastructure "plugs-in" to specific development tech stacks and continuous integration, continuous delivery, and continuous deployment frameworks used by different groups;
(v) providing a layered architecture to accommodate new tech stacks, languages, and target platforms; and
(vi) providing the ability to process and manage security vulnerabilities from diverse scanner types and security information sources.

Implementations of the present disclosure may be a computer system, a computer-implemented method, and/or a computer program product. The computer program product is not a transitory signal per se, and may include a computer readable storage medium (or media) having computer readable program instructions thereon for causing a processor to carry out aspects of the present disclosure. As described herein, the computer readable storage medium (or media) is a tangible storage medium (or media). It should also be understood by those of skill in the art that the terms media and medium are used interchangeable for both a plural and singular instance.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100.

Figure 2:
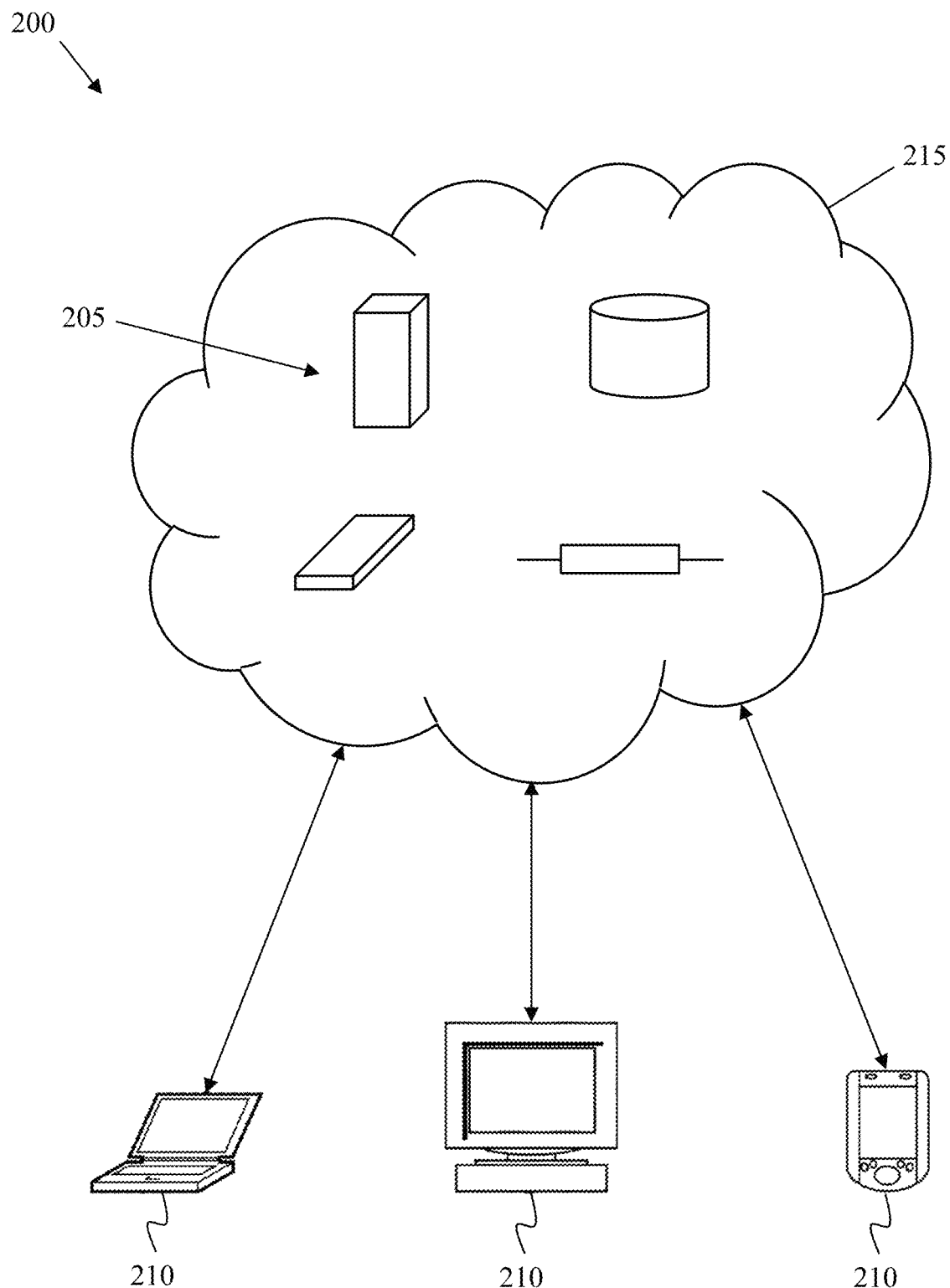
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions.

For example, processor 115 provides an enterprise-wide security approach with all stakeholders (e.g., Dev teams, leadership, CSO office, etc.) with a set of various security scanner types and information sources integrated into a single tool. In embodiments, the processor 105 uniformly integrates or packages existing scanner types into a single tool that standardizes and visually displays the output over different development teams for different scanner types. The scanner types which are packaged into the integrated security tool can capture specific requirements of the different teams, i.e., ensures that the tools support varied team development methodologies and different tech stacks to capture required security vulnerabilities. The processor 105 also establishes a regular feedback mechanism, and can be used to develop a process for remediation timelines and priority including at risk vulnerabilities.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured to integrate different scanner types into a single workbench or tool. This allows developers and other team members a uniform approach to assessing security vulnerabilities in a code throughout the enterprise. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. In embodiments, one or more aspects, functions and/or processes described herein may be performed and/or provided via cloud computing environment 200. As depicted in FIG. 2, cloud computing environment 200 includes cloud resources 205 that are made available to client devices 210 via a network 215, such as the Internet. Cloud resources 205 may be on a single network or a distributed network. Cloud resources 205 may be distributed across multiple cloud computing systems and/or individual network enabled computing devices. Cloud resources 205 can include a variety of hardware and/or software computing resources, such as servers, databases, storage, networks, applications, and platforms that perform the functions provided herein including storing code, running scanner types and provided an integration of plural scanner types into a uniform and standardized application, e.g., display format.

Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of a SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
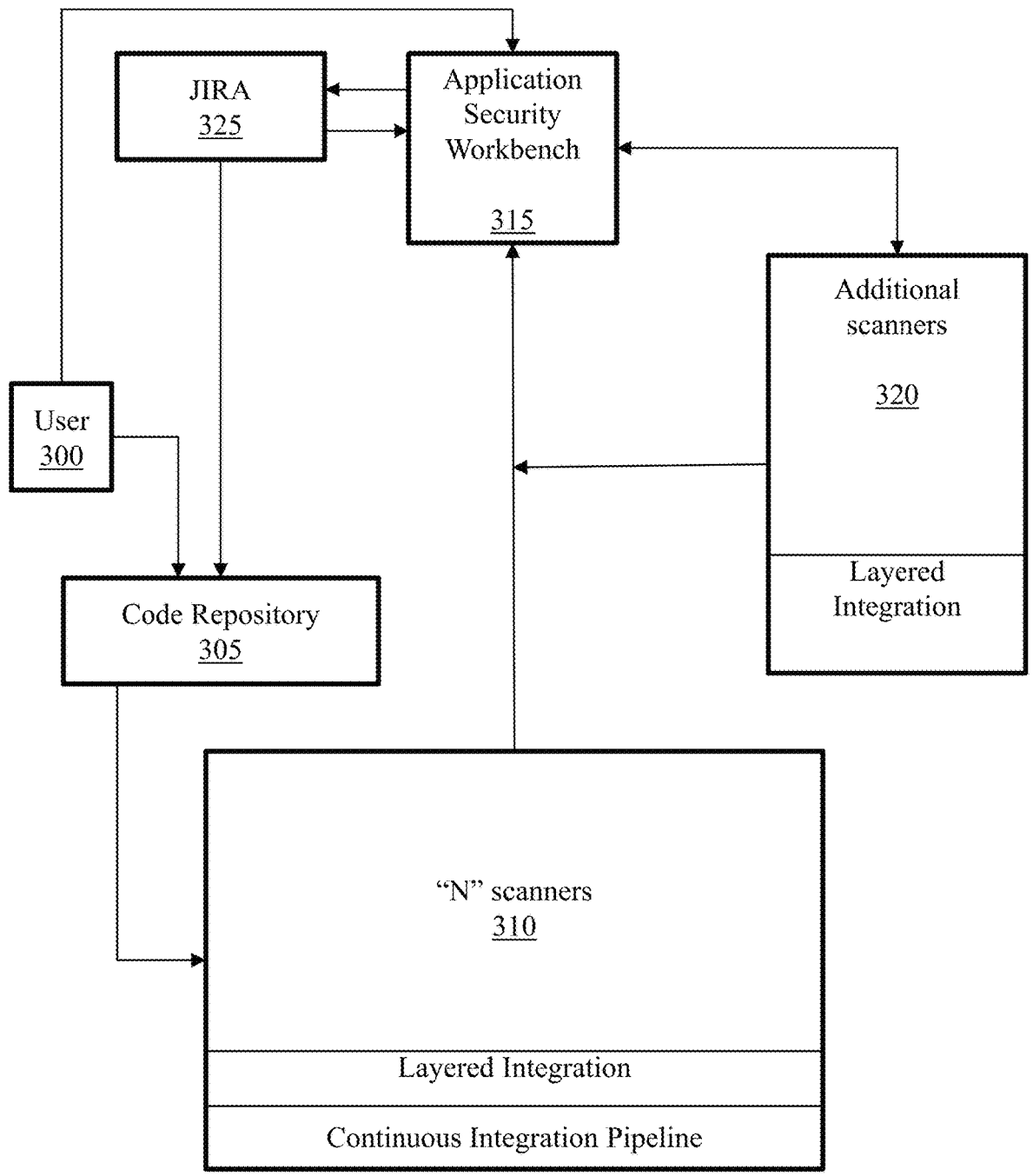
FIG. 3 shows a block diagram and/or flow diagram in accordance with aspects of the present disclosure.

FIG. 3 shows a block diagram in accordance with aspects of the present disclosure. More specifically, FIG. 3 shows a functional block diagram 300 that illustrates functionality of aspects of the present disclosure. FIG. 3 may also be illustrative of an exemplary flow for a process in accordance with aspects of the present disclosure. The exemplary flow can be illustrative of a system, a method, and/or a computer program product and related functionality implemented on the computing system of FIG. 1, in accordance with aspects of the present disclosure. The computer program product may include computer readable program instructions stored on computer readable storage medium (or media). The computer readable storage medium may include the one or more storage medium as described with regard to FIG. 1, e.g., non-transitory media, a tangible device, etc. The method, and/or computer program product implementing the flow of FIG. 3 can be downloaded to respective computing/processing devices, e.g., computing system of FIG. 1 as already described herein, or implemented on a cloud infrastructure as described with regard to FIG. 2. Accordingly, the processes associated with each flow of the present disclosure can be implemented by special purpose hardware-based systems that perform the specified functions or acts or carry out combinations of special purpose hardware and computer instructions.

More specifically, FIG. 3 shows a user 300 having access to a code repository 305 and an application security workbench 315 (e.g., the integrated security tool). As should be understood by those of ordinary skill in the art, the code repository 305 comprises an archive of code that is being worked on by a developer or development team. For example, the code repository 305 can include code for different software applications, e.g., products. The code may be divided by product, different branches of the product and different files within the branches. Different developers may work simultaneously on different files and/or branches of the product, as an example. Beyond the code itself, the code repository 305 may also maintain documentation, notes, web pages, and other items.

The application security workbench 315, on the other hand, integrates "n" number of scanner types 310 into a seamless, uniform and standardized format for display and generation of reports as described in more detail with respect to the graphical user interfaces shown in FIGS. 4-10. In addition, additional security information resources 320 may be injected at a cadence into the application security workbench 315 and be provided in the uniform and standardized format for visual display. The application security workbench 315 may request status updates of the additional security information resources 320.

In embodiments, "n" number of scanner types 310 can run on code stored in the code repository 305. For example, the "n" number scanner types 310 can be used to determine security vulnerabilities which are then standardized and visually displayed in the application security workbench 315. The "n" number of scanner types 310 may include any scanner type which allows software development (Dev), Security (Sec) and IT operations (Ops) (DevSecOps), etc., to provide quality, agile software applications free of security issues. By way of example, scanner types may include, but are not limited to, SAST (Static Application Security Testing) Scanner, SCA (Software Composition Analysis) Scanner, Embedded Secrets Scanner, DAST (Dynamic App Security) Scanner, Kubernets checker, cloud formation, etc. Additional scanner types can be integrated into the application security workbench 315. The additional security information resources 320 may also be integrated into the standardized format within the application security workbench 315, including security organization findings, offline enterprise scanners and technology specific scanner types.

In embodiments, the layered integration scheme provides a uniform manner to package the scanner types which can be plugged into a continuation integration pipeline, e.g., a Jenkins based pipeline. A continuation integration pipeline is a type of workflow which automates the software application delivery process. Specifically, Jenkins is an open-source automation tool which helps build and test software projects continuously. In some embodiments, pipelines may be built with text scripts which use a pipeline domain specific language which may be based on the Groovy programming language. Docker is an open platform testing applications in an isolated environment such a Docker container which allows you to deploy applications quicker. The layered integration scheme provides a uniform way to package different scanner types into docker images, with the dockerized scanner types being plugged into many different Continuous Integration (CI) pipelines, e.g., Jenkins based pipeline. It should be recognized by those of skill in the art that a docker image is a file used to execute code in a isolated environment called a Docker container. Docker images act as a set of instructions to build a Docker container, like a template. As should be understood by those of skill in the art, Jenkins is an open source automation server which enables developers to reliably build, test, and deploy their software. In embodiments, other pipelines are also contemplated herein. In embodiments, the value of dockerized scanners lies in their easy pluggability into many different CI/CD pipeline technologies. So, for example, a SAST scanner that has been dockerized can be used with a variety of pipelines including a Jenkins based pipeline, a AWS CodePipeline, or a CircleCI. A large enterprise may have several such pipeline technologies in use and may want to uniformly use a single SAST tool across all pipeline technologies.

In embodiments, the layered integration scheme provides a uniform manner to package the scanner types which can be plugged into a continuation pipeline, e.g., a Jenkins based pipeline. A continuation pipeline is a type of workflow which automates the software application delivery process. Specifically, Jenkins is an open-source automation tool which helps build and test software projects continuously. In some embodiments, pipelines may be built with text scripts which use a pipeline domain specific language which may be based on the Groovy programming language. In some embodiments, the software application may be tested using Docker. Docker is an open platform testing applications in an isolated The application security workbench 315 integrates the scanner types 310 and additional secretary information resources 320 into a seamless, uniform, and standardized format for display and generation of reports as described in more detail with respect to the graphical user interfaces of FIGS. 4-10. For example, the application security workbench 315 allows the user to view and prioritize security vulnerabilities in a standardized format, regardless of implementation of scanner type. The standardized display of vulnerabilities may include, for example, severity, remediation guidance, false positives, acceptable risk, etc. For example, the application security workbench 315 may be used to determine whether all vulnerabilities on a branch have been addressed, prior to merging the branches together and adding the files back into the code repository 305. The output of different scanners is normalized to a common data model in the workbench database. So even though different tools produce their outputs in varying formats (e.g., JSON, XML) and using different vocabularies (one tool may refer to security issues and a second one may refer to vulnerabilities), the workbench has a mapping layer that converts these different formats into a common data model which captures security information in a uniform way. This ensures that the workbench GUI can display all of these varied inputs in standardized fashion to developers.

In further embodiments, the application security workbench 315:
(i) ensures that code, artifacts, assemblies, docker images and cloud accounts can be linked to products and teams;
(ii) allows new scanner types or security information sources to be added as needed, including off-line scanner types and security information sources that are available asynchronously;
(iii) enables the developer to act on information including ways of sharing information between teams acting on similar vulnerabilities; and
(iv) provides division and product level rollups. This allows fine grained security vulnerability reports at a repository/artifact level, aggregate vulnerabilities at a department/product level, and expose extent of security maturity across division/products.

In embodiments, linkage is made possible by the addition of machine-readable meta-data which links code repositories to products. In other words, each code repository is required (as found in any source code management system, e.g., github or bitbucket) to include a file with the name of the product to which the repository code contributes. This information can be added when the repository is created and updated as necessary by an enterprise administrator. Further, this product information can be carried forward to downstream components created during the application build process, such as assemblies, libraries or docker images, so that these artifacts are also linked to a product. In addition, enterprises separately maintain a current list of users working on a product and we reference this product-to-developer mapping in the workbench. When a user logs into the workbench, we are able to direct them to the security issues that originate from the product (or products) for which they are responsible.

Accordingly, these features help development teams understand their application security (e.g., how secure is their application), while also helping them determine what needs to be done to make their applications (code base) more secure. Also, in this way, different development teams building different applications, e.g., application frameworks, mobile applications, database extension applications, APIs, etc. can now use different tool sets (e.g., scanner types that are relevant to a specific portion of the code) and different technology platforms while being provided with a uniform view of their overall security vulnerabilities using any number of different scanner types integrated into a single tool set.

FIG. 3 also shows JIRA 325 communicating with the application security workbench 315. JIRA refers to an issue tracking product which may be configured to track issues/bugs within a software code and provide other project management capabilities. For example, using the application security workbench 315, it is possible to automatically create JIRA tickets and submit these tickets for remediation using JIRA 325, as an illustrative example. In some embodiments, JIRA 325 may include an API for sharing any JIRA created with other issue tracking systems. In some embodiments, JIRA 325 may support issue tracking within popular agile frameworks such as Scrum and Kanban. JIRA 325 can also provide the application security workbench 315 with an updated status post of any remediations taken to resolve a ticket for an identified security vulnerability. As should be understood by those of skill in the art, JIRA 325 can be used for issue tracking and project management.

FIGS. 4-13 show various graphical user interfaces and underlying functionality in accordance with aspects of the present disclosure. The graphical user interfaces can be provided using one or more program modules such as program modules 165 described with respect to FIG. 1. The various graphical user interfaces are also representative of the underlying functionality of aspects of the present disclosure. For example, the various graphical user interfaces are illustrative of a system, a method, and/or a computer program product and related functionality implemented on the computing system of FIG. 1, in accordance with aspects of the present disclosure.

Figure 4:
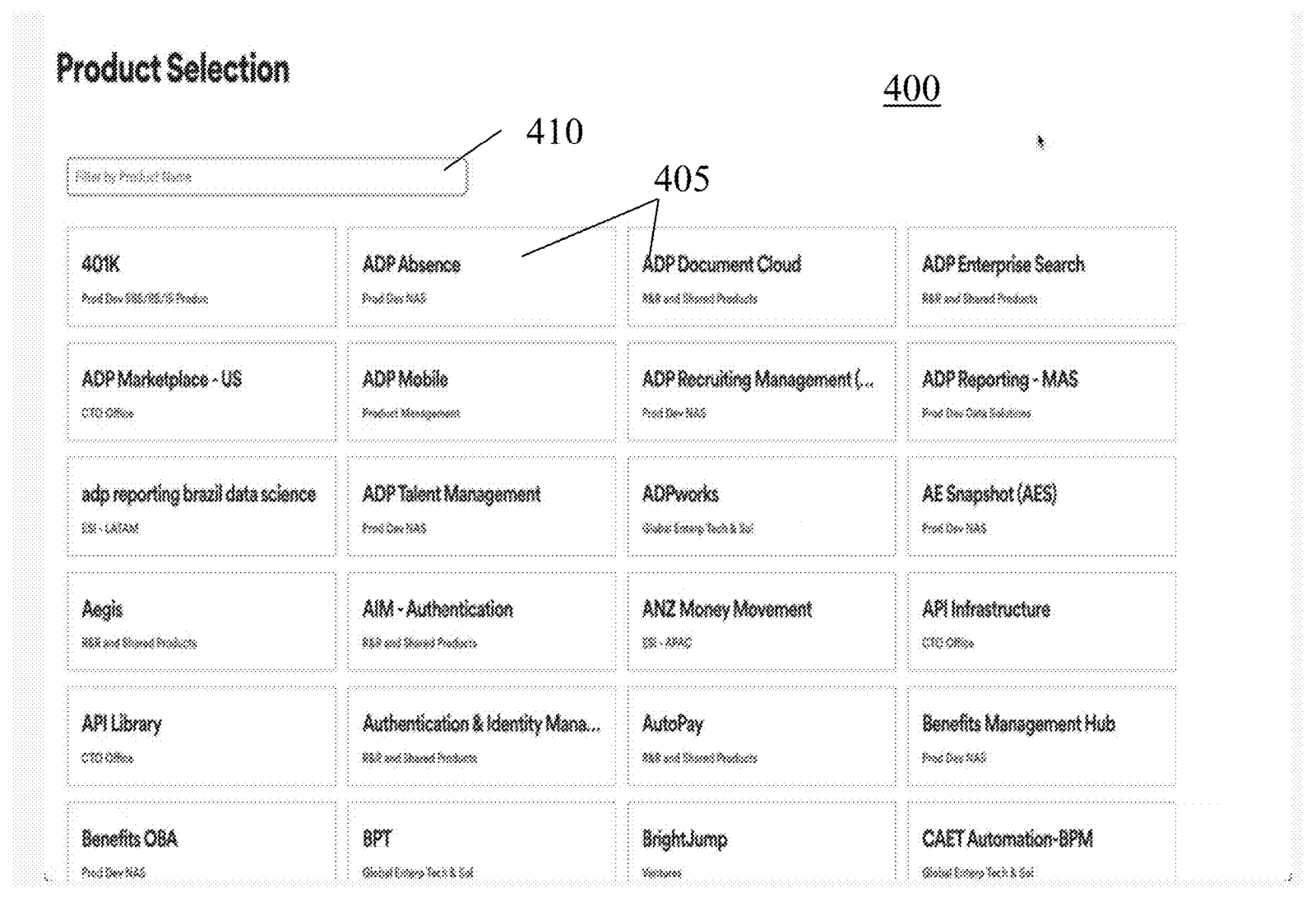

FIG. 4 shows a graphical user interface 400 which displays different products (e.g., software applications). For example, the graphical user interface 400 includes a plurality of different products 405 that may be selected by a user in order to view security vulnerabilities. In embodiments, the products 405 are representative of different software applications associated with one or more different development teams. In further embodiments, the graphical user interface 400 may include a search field 410, which allows the user to search for a particular product. By selecting a product 405, the system can automatically run any number of scanner types on the product and generate reports, etc. The user may be, for example, associated with different roles such as software development (Dev), Security (Sec), IT operations (Ops) or an administrator, etc.

FIG. 5 shows a graphical user interface 500 of a security summary for a plurality of repositories 510 for a particular product (as selected from a product of the graphical user interface 400 of FIG. 4). The user can select any particular repository 510 by selecting the appropriate box 510a. This may further generate additional information, e.g., security vulnerabilities, of the code for a particular repository 510. The repositories can also be searchable or filtered using search field 505. As should be understood by those of skill in the art, a single product (e.g., software application) may have code in hundreds of different repositories.

The graphical user interface 500 further includes a list of scanner types 515, e.g., code, secrets, library, etc., any of which may be selected and run on the code associated with the selected repositories 510. The issues may include any number of security vulnerability issues (as shown at reference numeral 525) for a particular repository 510 at a particular development branch, e.g., master branch, develop branch, etc. This may be used to determine that modifications made to code have added security vulnerability issues or reduced security vulnerability issues.

The security vulnerability issues may be categorized into severity level, e.g., critical, high, medium, and low, as shown at reference numeral 520. By selecting the level of security vulnerability issues 520 it is possible to categorize the issues based on severity level, e.g., critical, high, medium, and low. Also, by changing the severity level, e.g., from critical to low and high, the graphical user interface 500 may refresh itself with an updated list of security vulnerability issues 525 for the selected severity level. In this way, it is possible to visualize aggregate summaries of security vulnerability issues in a single report for different repositories, regardless of scanner type.

Figure 6:
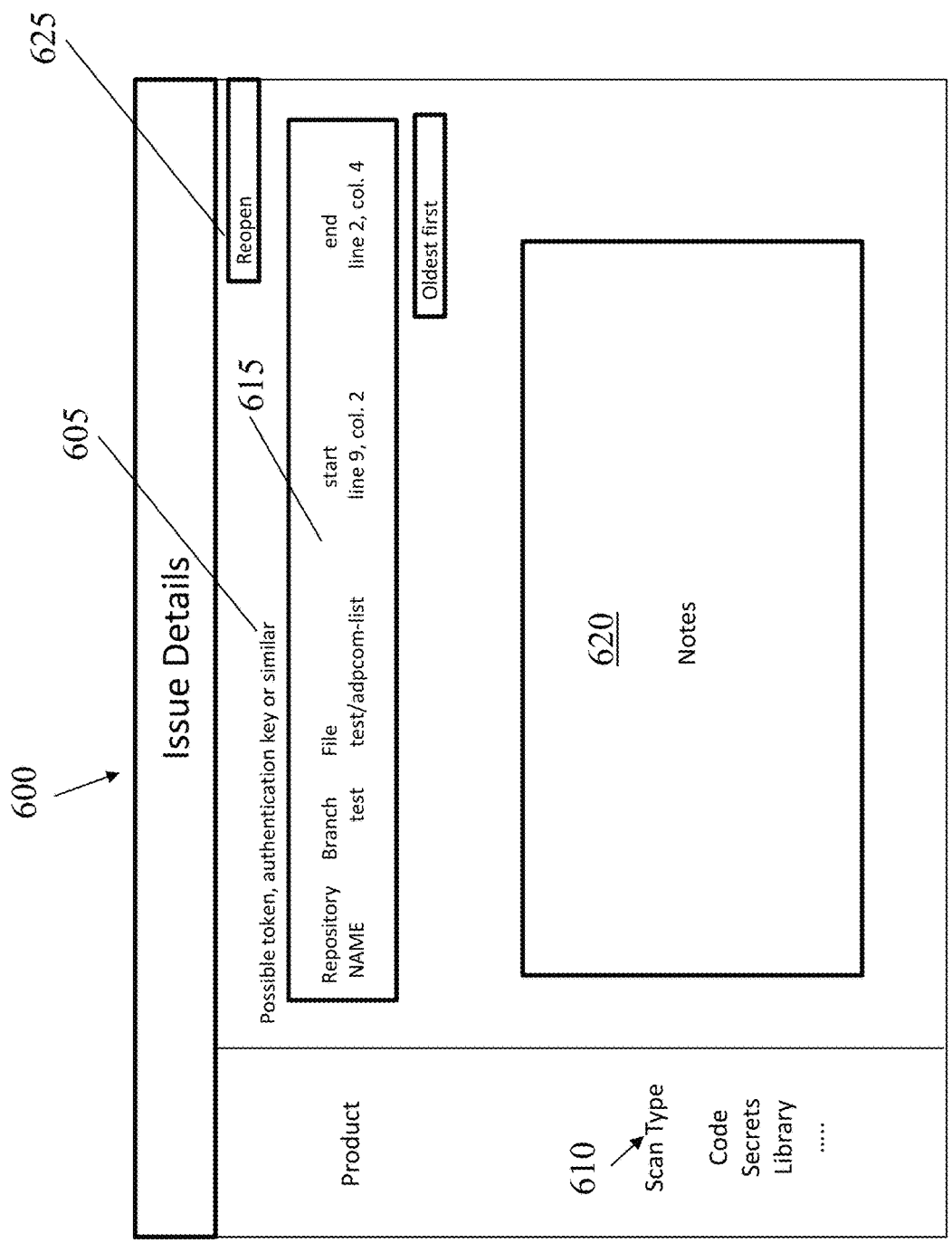
FIGS. 6-7 shows graphical user interfaces for displaying details regarding a particular security issue in the security summary of FIG. 5, in accordance with aspects of the present disclosure.

FIG. 6 shows a graphical user interface 600 providing further granularity of a particular security vulnerability issue 605 for a particular scanner type 610, e.g., secret scanner. For example, the security vulnerability issue 605 (e.g., possible token, authentication key) may be identified for a particular product, at a particular repository (e.g., section of the product), at a particular branch (e.g., section of the repository) and at a particular file (e.g., section of the branch) as shown at reference numeral 615. In this way, different classes of vulnerabilities may be identified and displayed in a uniform fashion for different scanner types. The graphical user interface 600 may also identify and show the particular start and end of the security vulnerability issue within the file.

By selecting a hyperlink, e.g., file name, the user can be directed to the security vulnerability issue of the specific code at the start and end location. The graphical user interface 600 also provides a display 620 which allows a user to enter notes, in addition to a mechanism 625 to reopen previous vulnerabilities. The vulnerabilities can be categorized in any order, e.g., oldest first, etc. Accordingly, the interface 600 provides a uniform way to display a breakdown of security vulnerability issues using different scanner types 610 for different products and sub-sets of the product, e.g., repository, branch of the repository and file within the branch as shown at reference numeral 615.

Figure 7:
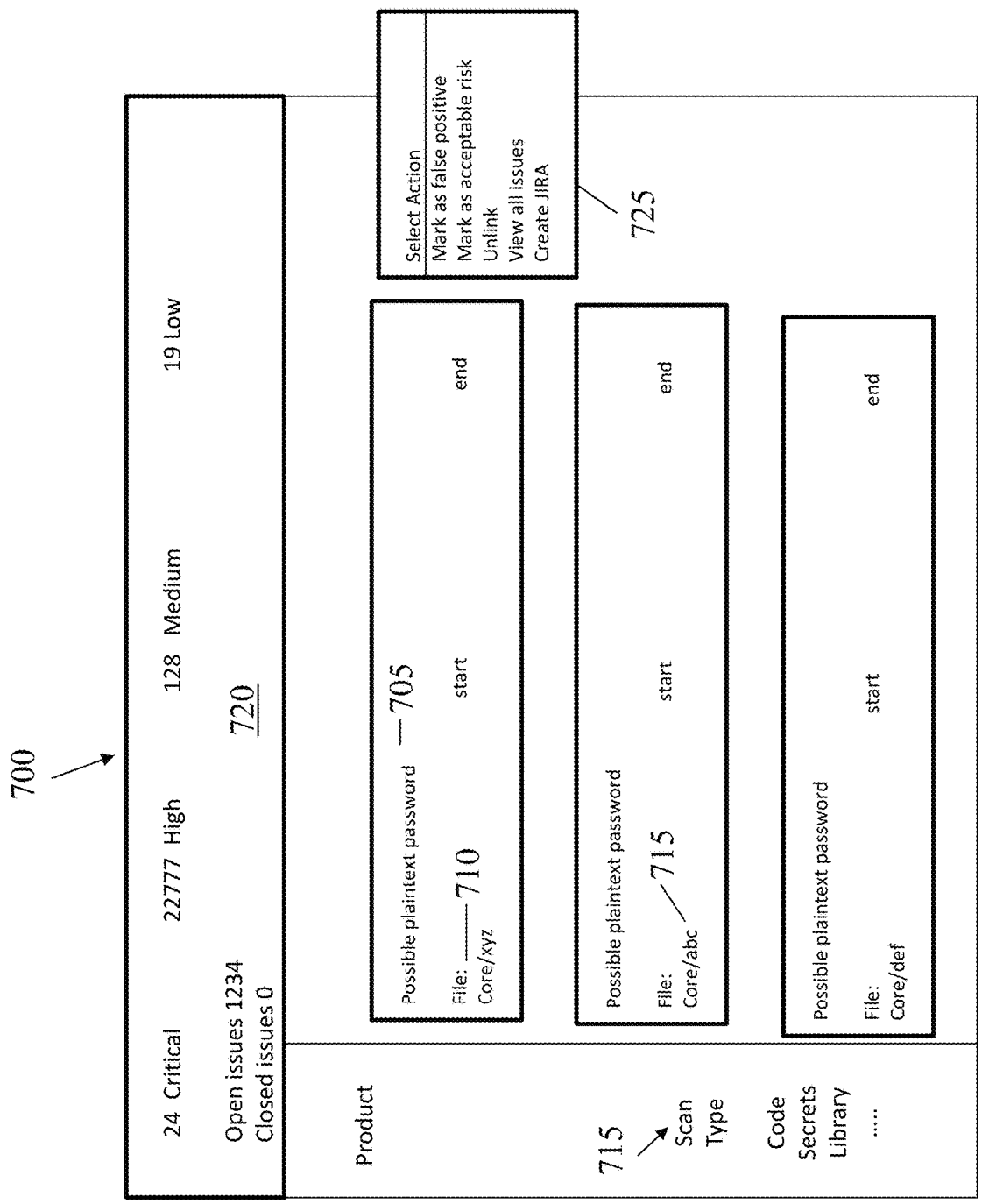

FIG. 7 shows a graphical user interface 700 providing further granularity of particular security vulnerability issues 705 for particular files 710 using a particular scanner 715, e.g., secret scanner. The particular files 710 may include a hyperlink to the specific code, in addition to an indication of start and end locations for the security vulnerability issues related to the code. The underlying functionality of the graphical user interface 700 will collate and correlate a summary of the security vulnerability issues 720, which may indicate the number of security vulnerability issues for critical, high, medium, and low, as well as the amount of opened issued and closed issues.

The graphical user interface 700 further provides a pull down menu 720 for each of the particular files 705, in which a user may select a certain action. These actions may tag the security vulnerability issue with certain a security vulnerability marking, e.g., false positive or acceptable risk, in addition to allowing the user to unlink the code or view all issues for the particular code. In addition, an option may be to automatically create a JIRA ticket.

Figure 8:
FIG. 8 shows a graphical user interface for creating a JIRA ticket, in accordance with aspects of the present disclosure.

FIG. 8 shows a graphical user interface 800 which is representative of a JIRA ticket. As should be understood by those of skill in the art, the JIRA ticket may be automatically generated directly from the application security workbench 315 of FIG. 3 by the selection of a particular security vulnerability issue for a product code of a particular product at any location within the code, e.g., file, branch, repository, etc.

In embodiments, the JIRA ticket may include the following illustrative field: project name 805; ticket type 810; and summary of the issue 815. The ticket may also include fields for the reporter of the security vulnerability issues 820 and a description of the particular issue at reference numeral 825. The ticket may also include a field for a person or team to assigned to fix the issue at reference numeral 830. In embodiments, the different fields may be automatically populated based on the security vulnerability issues as selected by the user in the graphical user interface 700 shown in FIG. 7 (e.g., application security workbench 315)

Figure 9:
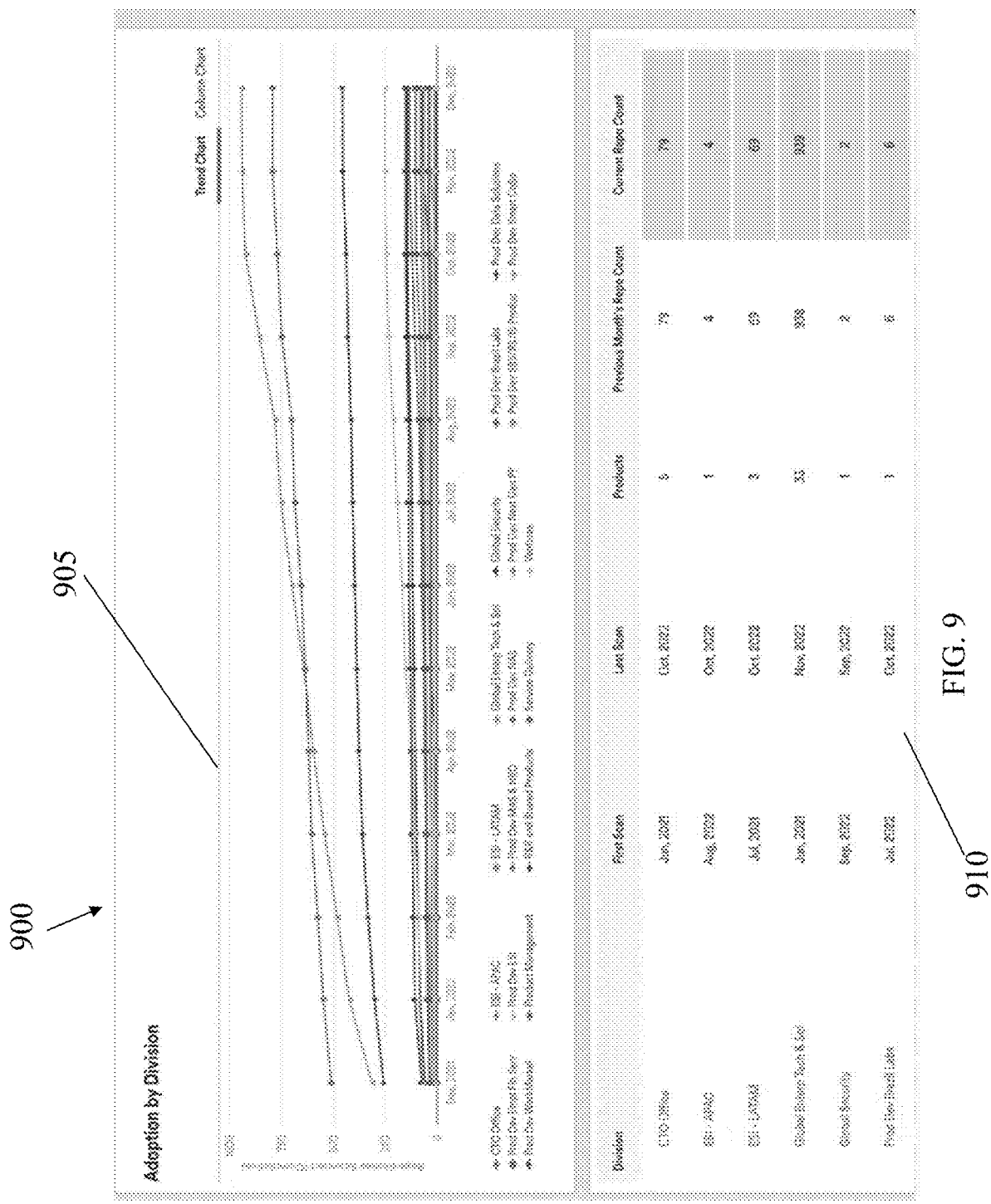
FIG. 9 shows a graphical user interface for displaying the number of scans provided on particular repositories over time, in accordance with aspects of the present disclosure.
Figure 10:
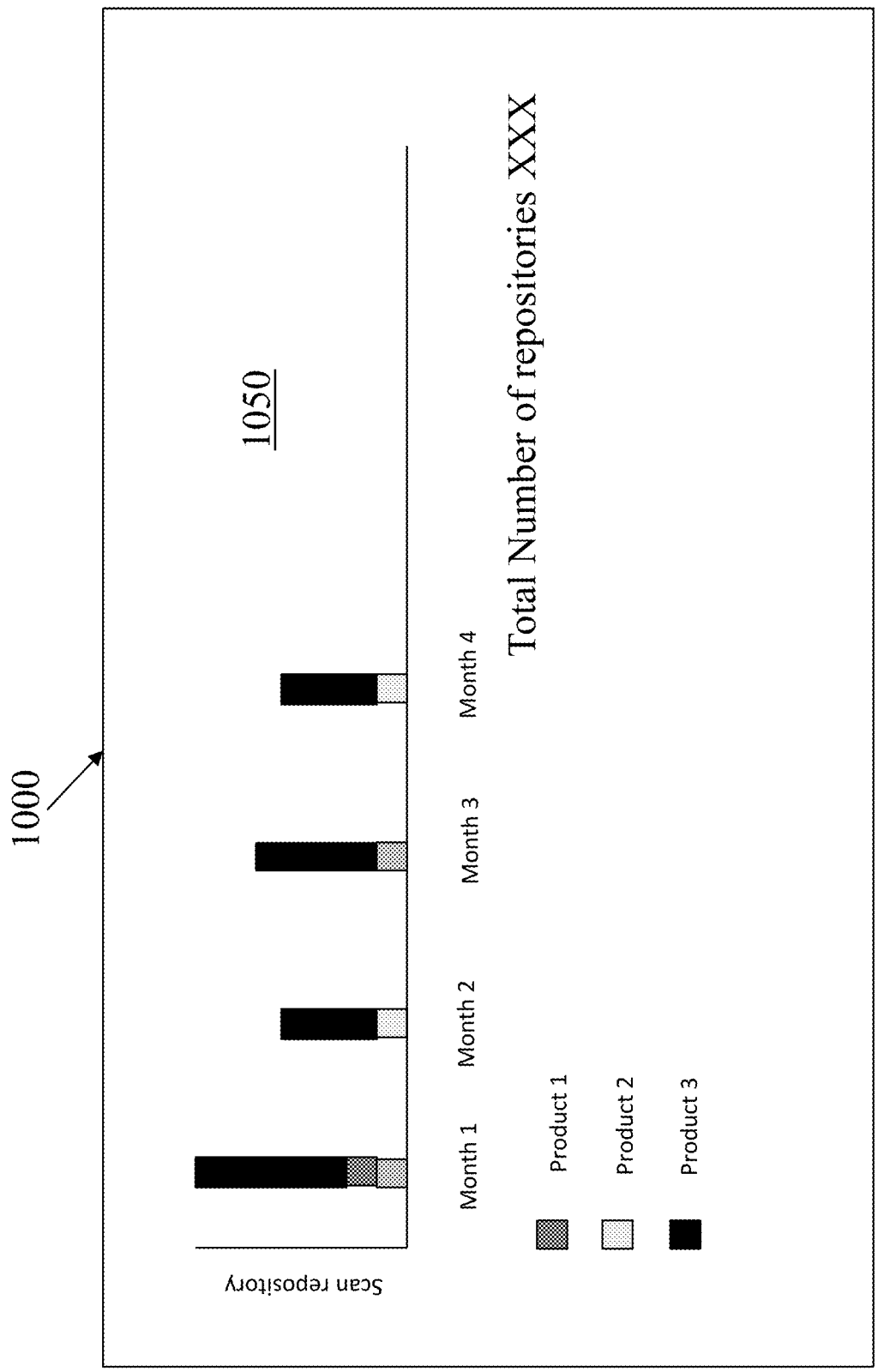
FIG. 10 shows a graphical user interface for displaying a number of repository scans for different products over time, in accordance with aspects of the present disclosure.

FIGS. 9 and 10 show graphical user interfaces which provide visual charts/displays/tables showing how each development team (e.g., division) is progressing over time with respect to their own security vulnerabilities for particular products. These interfaces may dashboards used by a team leader, development manager or other administrator or executive to generate progress reports related to the different security vulnerability issues associated with different products and/or different development teams. For example, the dashboards may be used to show progress of running different scanner types, which scanner types have been run, whether the vulnerabilities are being reduced over time, what type and/or number of vulnerabilities are present, e.g., as critical, high, the schedule for running a scan, etc. The displays shown in FIGS. 9 and 10 may also be used to, for example, determine how many repositories there are, how many branches there are and what percentage of them have been scanned.

For example, in FIG. 9, the graphical user interface 900 with the y-axis being representative of a number of scanned repositories and the x-axis being representative of time. For example, the graphical user interface 900 generates a chart 905 which allows the user, e.g., administrator or product manager, to track over time the number of scans provided on particular repositories for particular divisions. For example, the underlying functionality will collate and correlate the number of scans, types of scans, which repositories and/or products have been scanned, which teams have been scanning the code, etc. In FIG. 9, a flat line may indicate that no additional scans (or minimal amounts of scans) have been provided on a particular product. This may also represent the fact that all scans have been adopted to date. The chart 905 can also be used to represent different products, etc.

In embodiments, the chart 905 may also be interactive. For example, by hovering over any line, it is possible to determine the security posture and progress made on a particular product at a particular time, through a pop-up display. In this way, the user can track progress of security posture over time. The graphical user interface 900 also provides a table 910 which shows how different divisions are performing over time. This table 910 includes information such as first and last scan time, products scanned, previous months repository count and current repository count.

In FIG. 10, the graphical user interface 1000 generates a bar graph showing a number of repository scans for different portions of the product. Again, in this chart, the y-axis is representative of a number of scanned repositories and the x-axis is representative of different time periods. In use, the graphical user interface 1000 can generate a table 1005 which allows the user, e.g., administrator or product manager, to track over time the number of scans provided on a particular repository for a particular product, e.g., ADP marketplace, API infrastructure, etc. Similar to the display of FIG. 9, the chart can also be displayed in a tabular format. FIG. 10 may also show the total number of repositories. This will allow the team leader, developer manager or other administrator to assess whether the repositories in any of the charts (e.g., FIG. 9 or 10) are the total amount of repositories, or additional repositories require scanning.

In embodiments, the chart 1005 may also be interactive. For example, by hovering over any portion of the bar graph, it is possible to obtain a more granular view of the security issues. For example, as with the display in FIG. 9, it is possible to determine the security posture and progress made on a particular product at a particular time, through a pop up display.

Figure 11:
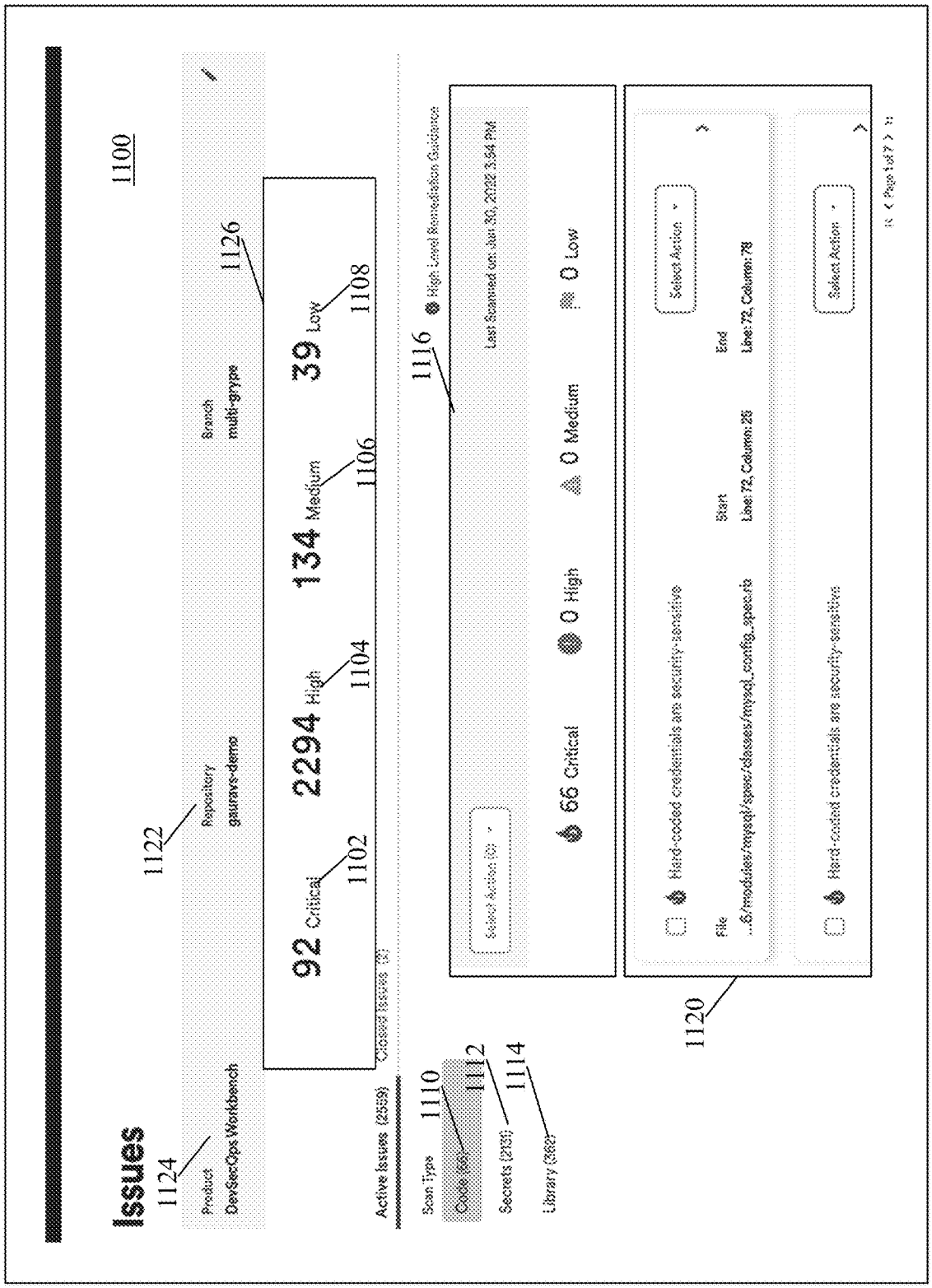
FIG. 11 shows a graphical user interface for displaying a security issues summary for a repository for a product, in accordance with aspects of the present disclosure.

Referring now to FIG. 11, a graphical user interface 1100 of a security summary for a single repository 1122 for a product 1124 is shown. The user interface 1100 provides a summary of the security vulnerabilities based on their security vulnerability level at summary 1126. For example, in the example embodiment shown in graphical user interface 1100, the summary of security vulnerabilities includes critical security vulnerability issues 1102, high security vulnerability issues 1104, medium vulnerability issues 1106, and low vulnerability issues 1108, where the critical vulnerability issues 1102 pose the highest security threat and the low vulnerability issues 1108 pose the lowest security threat.

The graphical user interface 1100 further includes a list of scanner types which can be clicked, selected, or otherwise engaged with to navigate to specific details about that particular scanner type. For example, the user interface 1100 include a code scanner type 1110, a secrets scanner type 1112, and a library scanner type. In some embodiments, other scanner types may be included in user interface 1100. Each of the scanner types may be selected to run on the code associated with the repository 1122 to identify any security vulnerabilities. When a scanner type is clicked, details about the security and vulnerability issues associated with scanner type may be shown in the secondary summary 1116 and the list of security vulnerabilities 1120. Specifically, the secondary summary 1116 may be similar to summary 1126, however, the secondary summary 1116 shows the security vulnerabilities based on their security vulnerability level for a particular scanner type instead of for an entire repository. The list of security vulnerabilities 1120 provides a list with a brief overview of each particular security vulnerability. In some embodiments, the list of security vulnerabilities includes select action button 1128 which may be clicked or selected to provide a list of actions to resolve the security vulnerability such as show in FIG. 7 with respect to 725.

Figure 12:
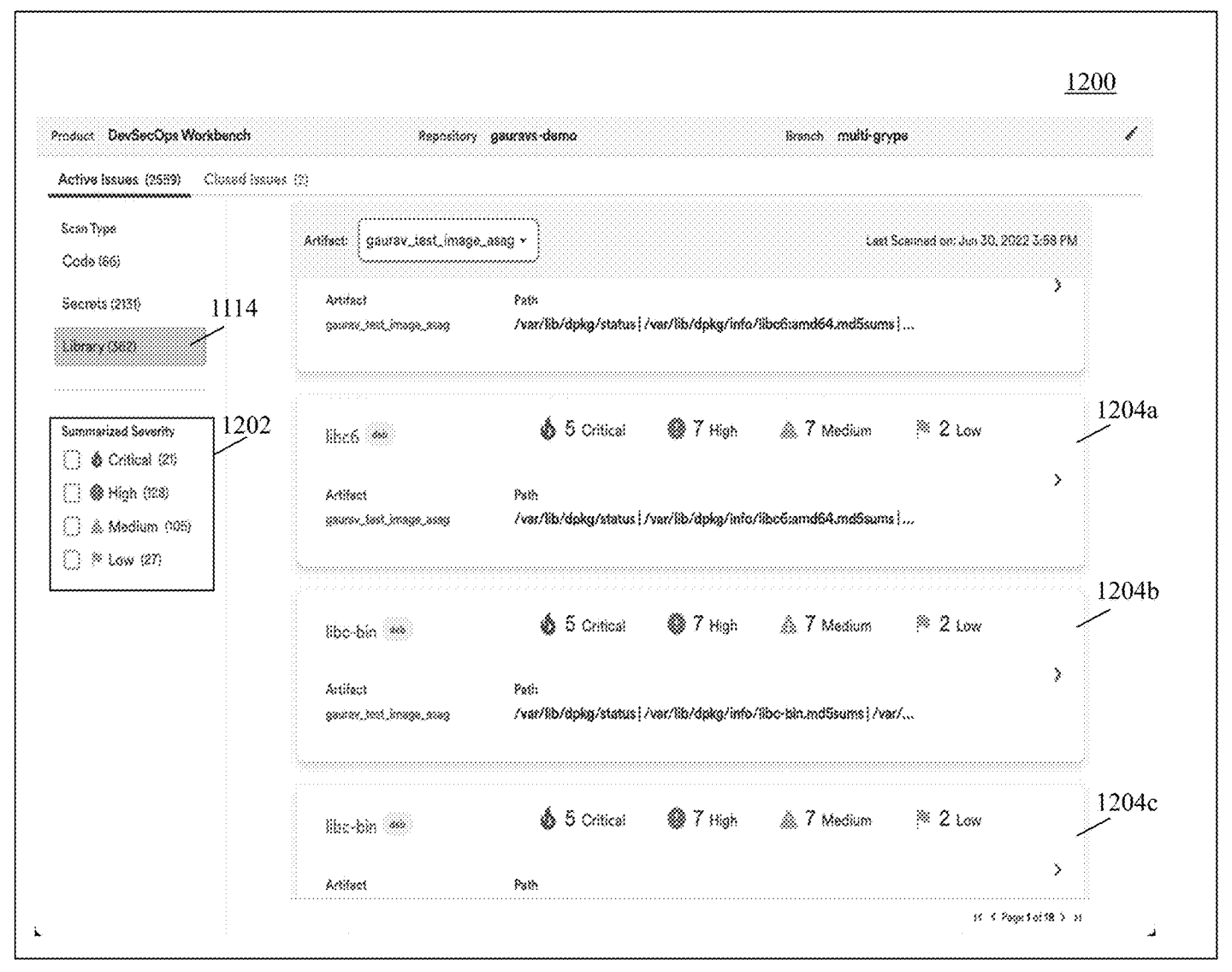

Referring now to FIG. 12, a graphical user interface 1200 for displaying the security issues of FIG. 11 for a particular scanner type is shown. Specifically, the graphical user interface 1200 displays a list of security vulnerabilities which may be shown when the library scanner type 1114 is selected in user interface 1100. The user interface 1200 includes a list of library scanner specific security vulnerabilities 1204a-1204c. In some embodiments, the user may filter the list of security vulnerabilities displayed in user interface 1200 at user interface portion 1202. Specifically, the user may filter the security vulnerabilities by security vulnerability level.

In some embodiments, a user may click or select one of the library scanner specific security vulnerabilities 1204a-1204c to navigate to a user interface which provides more specific detail on that particular security vulnerability. For example, referring now to FIG. 13, a graphical user interface 1300 for displaying the details of a particular security vulnerability of FIG. 12 is shown. Specifically, the user interface 1300 shows the details of library scanner specific security vulnerability 1204a. The details shown in the user interface 1300 may include a note 1302 which provides a detailed description of the security vulnerability 1204a. The details shown in the user interface 1300 may include one or more links 1304 which may redirect a user to a webpage with more information about the security vulnerability. The details shown in the user interface 1300 may include one or more security scores 1306. In some embodiments, the user interface 1300 includes a button 1308 which allows a user to mark one or more security vulnerabilities as acceptable.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A system, comprising:
   one or more processors; and
   memory, coupled with the one or more processors, the memory storing computer-executable instructions that, when executed by the one or more processors, cause the one or more processors to:
   receive a request to detect security vulnerabilities in one or more sections of software code, wherein the software code corresponds to a plurality of development branches;
   select one or more scanner tools configured to analyze respective sections of the software code, the selection based on an identifier of the one or more sections and a scanner type of the one or more scanner tools;
   identify, for each section of the software code, a corresponding development branch from the plurality of development branches;
   execute, via a containerized executable environment, each selected scanner tool on a corresponding section of the software code to generate scanner output in an unstructured format;
   convert, using a data model, the scanner output in the unstructured format into a standardized format by extracting values from the scanner output and mapping the values to fields defined in the data model; and
   cause a display of the scanner output in the standardized format via a graphical user interface, the display comprising the security vulnerabilities detected in the one or more sections of the software code by each selected scanner tool, the display further comprising a vulnerability summary comprising the security vulnerabilities detected in each development branch.

2. The system of claim 1, wherein the containerized executable environment is instantiated from a container image generated based on a respective scanner type for each selected scanner tool, and the one or more processors further:
   instantiate, for each selected scanner tool, a corresponding containerized executable environment from the container image;
   load the corresponding section of the software code into the corresponding containerized executable environment instantiated for each selected scanner tool; and terminate the corresponding containerized executable environment responsive at least in part to generation of the scanner output for each selected scanner tool.

3. The system of claim 1, wherein the one or more processors further:
   determine a software product associated with the software code;
   identify a code repository storing the software code associated with the software product;
   identify a file within the code repository and a location within the file corresponding to a detected security vulnerability; and
   update the display to present a visual indicator corresponding to the location within the file via the graphical user interface.

4. The system of claim 1, wherein the one or more processors further:
   generate the vulnerability summary comprising the security vulnerabilities detected in each development branch; and
   update the display to present the vulnerability summary via the graphical user interface.

5. The system of claim 1, wherein the one or more processors further:
   categorize the security vulnerabilities detected by each selected scanner tool into a plurality of severity levels;
   receive, via the graphical user interface, a selection corresponding to at least one severity level; and
   update the display to present a filtered view comprising the security vulnerabilities corresponding to the at least one severity level via the graphical user interface.

6. The system of claim 1, wherein the one or more processors further:
   generate a hyperlink associated with each detected security vulnerability;
   update the display to present the hyperlink via the graphical user interface; and
   in response to a selection of a respective hyperlink, update the display to present a view of the corresponding section of the software code via the graphical user interface.

7. The system of claim 1, wherein to convert the scanner output into the standardized format, the one or more processors further:
   receive the scanner output in a respective data format of each selected scanner tool;
   extract the values from the scanner output based on the respective data format of each selected scanner tool; and
   map the values to the fields based on a schema defined by the data model.

8. The system of claim 1, wherein the one or more processors further:
   update the display to present a listing of selectable actions via the graphical user interface, each selectable action associated with a predefined operation to address a detected security vulnerability; and
   responsive at least in part to a selection of at least one action of the listing of selectable actions, initiate execution of the predefined operation associated with at least one action.

9. The system of claim 1, wherein the one or more processors further:
   generate a ticket corresponding to one or more of the security vulnerabilities detected by each selected scanner;
   automatically populate the ticket with information comprising an affected code section, a scanner type associated with the affected code section, and a corresponding severity level; and
   transmit the ticket to a project management system configured to track a status of the security vulnerabilities over time.

10. The system of claim 1, wherein the one or more processors further:
    generate a plurality of time-based attributes indicating a time of detection for each detected security vulnerability and one or more updates applied over time;
    generate a time-based view each detected security vulnerability based on the plurality of time-based attributes; and
    update the display to present the time-based view in response to a selection of a time-based filter via the graphical user interface, the time-based view comprising a visual representation of changes for each detected security vulnerability over time.

11. A method, comprising:
    receiving, by one or more processors, coupled with memory, a request to detect security vulnerabilities in one or more sections of software code, wherein the software code corresponds to a plurality of development branches;
    selecting, by the one or more processors, one or more scanner tools configured to analyze respective sections of the software code, the selection based on an identifier of the one or more sections and a scanner type of the one or more scanner tools;
    identifying, by the one or more processors, for each section of the software code, a corresponding development branch from the plurality of development branches;
    executing, by the one or more processors, via a containerized executable environment, each selected scanner tool on a corresponding section of the software code to generate scanner output in an unstructured format;
    converting, by the one or more processors, using a data model, the scanner output in the unstructured format into a standardized format by extracting values from the scanner output and mapping the values to fields defined in the data model; and
    causing, by the one or more processors, a display of the scanner output in the standardized format via a graphical user interface, the display comprising the security vulnerabilities detected in the one or more sections of the software code by each selected scanner tool, the display further comprising a vulnerability summary comprising the security vulnerabilities detected in each development branch.

12. The method of claim 11, wherein the containerized executable environment is instantiated from a container image generated based on a respective scanner type for each selected scanner tool, and the method further comprising:
    instantiating, by the one or more processors, for each selected scanner tool, a corresponding containerized executable environment from the container image;
    loading, by the one or more processors, the corresponding section of the software code into the corresponding containerized executable environment instantiated for each selected scanner tool; and
    terminating, by the one or more processors, the corresponding containerized executable environment responsive at least in part to generation of the scanner output for each selected scanner tool.

13. The method of claim 11, further comprising:
- determining, by the one or more processors, a software product associated with the software code;
- identifying, by the one or more processors, a code repository storing the software code associated with the software product;
- identifying, by the one or more processors, a file within the code repository and a location within the file corresponding to a detected security vulnerability; and
- updating, by the one or more processors, the display to present a visual indicator corresponding to the location within the file via the graphical user interface.

14. The method of claim 11, further comprising:
- generating, by the one or more processors, the vulnerability summary comprising the security vulnerabilities detected in each development branch; and
- updating, by the one or more processors, the display to present the vulnerability summary via the graphical user interface.

15. The method of claim 11, further comprising:
- categorizing, by the one or more processors, the security vulnerabilities detected by each selected scanner tool into a plurality of severity levels;
- receiving, by the one or more processors, via the graphical user interface, a selection corresponding to at least one severity level; and
- updating, by the one or more processors, the display to present a filtered view comprising the security vulnerabilities corresponding to the at least one severity level via the graphical user interface.

16. The method of claim 11, further comprising:
- generating, by the one or more processors, a hyperlink associated with each detected security vulnerability;
- updating, by the one or more processors, the display to present the hyperlink via the graphical user interface; and
- in response to a selection of a respective hyperlink, updating, by the one or more processors, the display to present a view of the corresponding section of the software code via the graphical user interface.

17. The method of claim 11, wherein converting the scanner output into the standardized format further comprises:
- receiving, by the one or more processors, the scanner output in a respective data format of each selected scanner tool;
- extracting, by the one or more processors, the values from the scanner output based on the respective data format of each selected scanner tool; and
- mapping, by the one or more processors, the values to the fields based on a schema defined by the data model.

18. The method of claim 11, further comprising:
- updating, by the one or more processors, the display to present a listing of selectable actions via the graphical user interface, each selectable action associated with a predefined operation to address a detected security vulnerability; and
- responsive at least in part to a selection of at least one action of the listing of selectable actions, initiating, by the one or more processors, execution of the predefined operation associated with at least one action.

19. The method of claim 11, further comprising:
- generating, by the one or more processors, a ticket corresponding to one or more of the security vulnerabilities detected by each selected scanner;
- automatically populating, by the one or more processors, the ticket with information comprising an affected code section, a scanner type associated with the affected code section, and a corresponding severity level; and
- transmitting, by the one or more processors, the ticket to a project management system configured to track a status of the security vulnerabilities over time.

20. One or more non-transitory computer-readable storage media (CRM) having one or more instructions stored thereon that, when executed by one or more computer processors, cause the one or more computer processors to:
- receive a request to detect security vulnerabilities in one or more sections of software code, wherein the software code corresponds to a plurality of development branches;
- select one or more scanner tools configured to analyze respective sections of the software code, the selection based on an identifier of the one or more sections and a scanner type of the one or more scanner tools;
- identify, for each section of the software code, a corresponding development branch from the plurality of development branches;
- execute, via a containerized executable environment, each selected scanner tool on a corresponding section of the software code to generate scanner output in an unstructured format;
- convert, using a data model, the scanner output in the unstructured format into a standardized format by extracting values from the scanner output and mapping the values to fields defined in the data model; and
- cause a display of the scanner output in the standardized format via a graphical user interface, the display comprising the security vulnerabilities detected in the one or more sections of the software code by each selected scanner tool, the display further comprising a vulnerability summary comprising the security vulnerabilities detected in each development branch.

* * * * *